US009942101B2

(12) United States Patent
Page et al.

(10) Patent No.: US 9,942,101 B2
(45) Date of Patent: *Apr. 10, 2018

(54) METHOD AND SYSTEM FOR COLLECTING TOPOLOGY INFORMATION

(71) Applicant: Viavi Solutions Inc., Milpitas, CA (US)

(72) Inventors: John M. Page, Colorado Springs, CO (US); Samuel M. Bauer, Colorado Springs, CO (US); Canning Hsueh, Colorado Springs, CO (US); Michael Stevens, Fountain, CO (US)

(73) Assignee: VIAVI Solutions Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/200,853

(22) Filed: Jul. 1, 2016

(65) Prior Publication Data
US 2016/0315821 A1 Oct. 27, 2016

Related U.S. Application Data

(63) Continuation of application No. 13/714,036, filed on Dec. 13, 2012, now Pat. No. 9,397,895.
(Continued)

(51) Int. Cl.
H04L 12/24 (2006.01)
H04L 29/08 (2006.01)
(Continued)

(52) U.S. Cl.
CPC .............. *H04L 41/12* (2013.01); *H04L 45/20* (2013.01); *H04L 61/6022* (2013.01); *H04L 67/12* (2013.01); *Y02B 60/43* (2013.01)

(58) Field of Classification Search
CPC ................................ H04L 41/12; H04L 67/12
See application file for complete search history.

(56) References Cited

U.S. PATENT DOCUMENTS 5,185,860 A 2/1993 Wu
6,108,782 A 8/2000 Fletcher et al.
(Continued)

FOREIGN PATENT DOCUMENTS

GB 2 371 442 7/2002
GB 2426145 11/2006
(Continued)

OTHER PUBLICATIONS

Search report for EP application No. 13155385.1, Apr. 18, 2013, 6 pgs.
(Continued)

*Primary Examiner* — Hassan Kizou
*Assistant Examiner* — Deepa Belur
(74) *Attorney, Agent, or Firm* — Harrity & Harrity, LLP

(57) ABSTRACT

A method of providing topology information about a network to a topology manager is disclosed. The network includes a plurality of sensors each having a sensor ID, and the method includes performing the following steps at each of the plurality of sensors: receiving a stream of packets and identifying a topology trace packet in the stream of packets, wherein the topology trace packet has a destination address and an ID of a previous sensor, including the sensor ID in the topology trace packet, sending the topology trace packet to the destination address, forming a report message so as to include the sensor ID, the previous sensor ID, sending the report to the topology manager; and, providing network addresses of adjacent nodes to the topology manager.

21 Claims, 14 Drawing Sheets

Related U.S. Application Data

(60) Provisional application No. 61/570,171, filed on Dec. 13, 2011.

(51) Int. Cl.
*H04L 12/733* (2013.01)
*H04L 29/12* (2006.01)

(56) References Cited

U.S. PATENT DOCUMENTS

| | | | |
|---|---|---|---|
| 6,286,039 | B1 | 9/2001 | Van Home et al. |
| 7,054,951 | B1* | 5/2006 | Kao ............. H04L 12/42 709/242 |
| 7,149,533 | B2 | 12/2006 | Laird et al. |
| 7,299,277 | B1 | 11/2007 | Moran et al. |
| 7,336,673 | B2 | 2/2008 | Ilnicki et al. |
| 7,337,233 | B2 | 2/2008 | Dillon |
| 7,366,113 | B1 | 4/2008 | Chandra et al. |
| 7,506,065 | B2 | 3/2009 | LaVigne et al. |
| 7,688,754 | B2 | 3/2010 | Williams |
| 7,733,773 | B2 | 6/2010 | Wager et al. |
| 7,804,832 | B2 | 9/2010 | Andrews et al. |
| 7,990,897 | B2* | 8/2011 | Jing ............. H04L 12/2807 370/255 |
| 9,125,097 | B2 | 9/2015 | Salonidis et al. |
| 9,397,895 | B2 | 7/2016 | Page et al. |
| 2001/0039579 | A1 | 11/2001 | Treka et al. |
| 2003/0141093 | A1* | 7/2003 | Tirosh ........... H04L 45/00 174/72 A |
| 2003/0223376 | A1 | 12/2003 | Elliott et al. |
| 2004/0001443 | A1 | 1/2004 | Soon et al. |
| 2004/0208129 | A1 | 10/2004 | Old et al. |
| 2007/0006292 | A1 | 1/2007 | Jaenicke |
| 2008/0285452 | A1 | 11/2008 | Oran |
| 2009/0290500 | A1 | 11/2009 | Nishi et al. |
| 2010/0074112 | A1* | 3/2010 | Derr ............ H04L 41/12 370/232 |
| 2010/0115414 | A1 | 5/2010 | Kats et al. |
| 2010/0272082 | A1* | 10/2010 | Niranjan ......... H04L 45/02 370/338 |
| 2011/0128962 | A1* | 6/2011 | Hunkeler ......... H04L 45/36 370/393 |
| 2011/0134797 | A1* | 6/2011 | Banks ........... H04W 40/246 370/254 |
| 2011/0158240 | A1 | 6/2011 | Sun et al. |
| 2012/0158933 | A1 | 6/2012 | Shetty et al. |
| 2012/0250519 | A1 | 10/2012 | Stevens et al. |
| 2013/0077529 | A1 | 3/2013 | Lueckenhoff et al. |
| 2013/0128751 | A1 | 5/2013 | Keesra et al. |
| 2013/0159549 | A1 | 6/2013 | Kompella |
| 2013/0311805 | A1 | 11/2013 | Berke et al. |
| 2015/0016469 | A1* | 1/2015 | Ganichev ........ H04L 49/90 370/429 |
| 2015/0222695 | A1* | 8/2015 | Lee ............. H04L 61/103 709/201 |

FOREIGN PATENT DOCUMENTS

| | | |
|---|---|---|
| WO | 2004051868 A2 | 6/2004 |
| WO | 2005111805 | 11/2005 |
| WO | 2009001067 | 12/2008 |

OTHER PUBLICATIONS

Enns et al., "Device Discovery Protocol (DDP) draft-marques-ddp-00.txt; draft-marques-ddp-00.txt", IETF Standard-Working-Draft, Internet Engineering Task Force, IETF, CH, May 2003, 10 pages.
Claise et al., "Packet Sampling (PSAMP) Protocol Specifications; rfc5476.txt", Packet Sampling (PSAMP) Protocol Specification; RFC5476 TXT, Internet Engineering Task Force, IETF; Standard, Internet Society (ISOC) 4, Rue Des Falaises CH-1205 Geneva, Switzerland, Mar. 1, 2009, XP015065545, 46 pages.
Kaeo et al., "Methodolgy for Benchmarking IPsec Devices; draft-ietf-bmwg-ipsec-met h-05.txt", Methodology for Benchmarking IPSEC Devices; Draft-IETF-BMWG-IPSPEC-METH-05.TXT, Internet Engineering Task Force, IETF; Standardworkingdraft, Internet Society (ISOC) 4, Rue Des Falaises CH-1205 Geneva, Switzerland, vol. bmwg, No. 5, Jul. 28, 2009, XP015063661, 42 pages.

* cited by examiner

ICMP Packet:

| Ethernet | IP | ICMP Header & Data |
|---|---|---|

ICMP header for Router Solicitation:

| Type 8bits "10" | Code 8bits "0" | CRC 16 bits |
|---|---|---|

ICMP router advertisement packet:

| Type 8bits "9" | Code 8bits "0" | CRC 16 bits | Data Variable |
|---|---|---|---|

IPv6 packet:

| Ethernet | IPv6 | ICMPv6 Header & Data |
|---|---|---|

ICMPv6 header for Router Solicitation:

| Type 8bits "133" | Code 8bits "0" | CRC 16 bits |
|---|---|---|

ICMPv6 router advertisement:

| Type 8bits "134" | Code 8bits "0" | CRC 16 bits | Data Variable |
|---|---|---|---|

FIG. 7

| | |
|---|---|
| Destination MAC Address | 6 |
| Source MAC Address | 6 |
| Length Type | 2 |
| SubType = LACP | 1 |
| Version Number | 1 |
| TLV_Type = Actor Information | 1 |
| Actor_Information_Length = 20 | 1 |
| Actor_System_Priority | 2 |
| Actor_System | 6 |
| Actor_Key | 2 |
| Actor_Port_Priority | 2 |
| Actor_Port | 2 |
| Actor_State | 1 |
| Reserved | 3 |
| TLV_Type = Partner Information | 1 |
| Partner_Information_Length = 20 | 1 |
| Partner_System_Priority | 2 |
| Partner_System | 6 |
| Partner_Key | 2 |
| Partner_Port_Priority | 2 |
| Partner_Port | 2 |
| Partner_State | 1 |
| Reserved | 3 |
| TLV_Type = Collector Information | 1 |
| Collector_Information_Length = 16 | 1 |
| CollectorMaxDelay | 2 |
| Reserved | 12 |
| TLV_Type = Terminator | 1 |
| Treminator Length = 0 | 1 |
| Reserved | 50 |
| FCS | 4 |

FIG. 8

METHOD AND SYSTEM FOR COLLECTING TOPOLOGY INFORMATION

CROSS-REFERENCE TO RELATED APPLICATIONS

This application is a continuation of U.S. patent application Ser. No. 13/714,036, filed Dec. 13, 2012, (now U.S. Pat. No. 9,397,895) which claims priority from U.S. Provisional Patent Application No. 61/570,171 filed Dec. 13, 2011, the disclosures of which are incorporated herein by reference.

TECHNICAL FIELD

The present invention relates generally to networking and communications technology and, more particularly, to methods of discovering network topology.

BACKGROUND OF THE INVENTION

Communication networks are widely used today; the variety of networks includes the Internet, wide-area networks (WANs), local-area networks (LANs), telephony networks, and wireless networks. The importance of network monitoring and testing is growing as well as the requirements for related methods and equipment. The monitoring of the networks requires accurate knowledge of network topology. For example, the information about network topology enables a Network Management System (NMS) to correlate pieces of end-to-end diagnostics and monitoring information to identify failed components and performance bottlenecks. Furthermore, higher-level network management functions, such as root-cause-analysis (RCA), service-level-agreements (SLA) monitoring, and network failure impact analysis, can be done via the analysis performed on top of the monitored topology.

The technologies in network management for topology monitoring typically rely on the ability of the NMS to query every node in the network to discover network links and determine current states of the network links. For example, a network management system would discover the topology of the network by a BFS (Breadth First Search) process, i.e., iterating the process of querying a node's adjacency table that lists its neighbors and visiting its neighbors until no more new nodes (or links) can be discovered. However, this approach requires participation of all the nodes, i.e. having related protocol software installed and configured to cooperate. Conventional methods of mapping network topology also have the scalability problem.

Accordingly, there is a need to mitigate the disadvantages of existing mapping systems and methods and to provide a novel method and a system for mapping network topology. In particular, a need exists for a system and method of discovering network topology by an independent tool, and by a method transparent to the user.

SUMMARY OF THE INVENTION

A method of collecting topology information about a network and providing the information to a topology manager is disclosed, wherein the network includes a first sensor having a first sensor ID and a second sensor having a second sensor ID. The method includes: receiving a stream of packets and identifying a topology trace packet in the stream of packets, wherein the topology trace packet has a destination IP address, and the second sensor ID in a payload of the topology trace packet. The method further includes modifying the topology trace packet so as to include the first sensor ID into the payload, and sending the topology trace packet to the destination address, forming a report so as to include the first sensor ID, the second sensor ID, and TTL data, and sending the report to the topology manager. Preferably, the method also includes providing network addresses of adjacent nodes to the topology manager, either within the report or by other means. The report may be sent to a source IP address of the topology trace packet.

In another aspect of the invention, a method of forming topology representation of a network includes providing topology information about the network by a plurality of sensors to a topology manager; the topology manager constructs partial topology representations based on information obtained from report messages and combines the partial topology representations into a combined topology representation of the network, wherein the reports may include sensor IDs, Mac Addresses, and Time-To-Live (TTL)-related values.

A system is provided which includes at least two sensors having first and second sensor IDs. The first sensor includes: an input port for receiving a stream of packets; a tangible memory with computer instructions stored therein; and, a processor for executing the computer instructions and causing the sensor to (i) identify a topology trace packet in the stream of packets, wherein the topology trace packet has a destination address, and the second sensor II) in a payload of the topology trace packet, (ii) modify the topology trace packet so as to include the first sensor ID, and send the topology trace packet to the destination IP address, (iii) form a report so as to include the first sensor ID, the second sensor ID, and TTL data, and send the report to a topology manager. The system may include a topology manager in communication with the sensors.

BRIEF DESCRIPTION OF THE DRAWINGS

The invention will be described in greater detail with reference to the accompanying drawings which represent preferred embodiments thereof, wherein:

FIG. 7 is a diagram illustrating packet formats;

FIG. 8 is a diagram illustrating a packet format;

DETAILED DESCRIPTION

A plurality of devices may be disposed in a network for monitoring communication along the network. Monitoring sensors may be attached directly to a port or passive network tap at a switch or element; the devices are generally referred to as sensors or probes.

According to the method disclosed herein, traffic monitoring sensors may be used for active discovery of network topology. When the discovery feature is enabled and the sensors are queried by a topology manager, they provide information to the topology manager about other sensors, and possibly distances (in hops) so that the topology manager may incrementally build a topology representation of a subnetwork formed of the sensors. Additionally, the sensors provide information about other devices on the network, such as switches, routers, etc. The subnetwork topology representation (map) serves as a skeleton supporting information related to other devices, With reference to FIG. 1, a plurality of sensors including sensors 110, 120, and 130 are provided for monitoring a network 100 which includes nodes 160 and 170. Together with a topology manager 150, the sensors form a topology discovery system. While each sensor is used to help define the topology of the network, it may also have other functionality such as remote testing and monitoring of the network.

The communication network 100 may be any type of packet network, currently known or later developed, including the Internet, WAN, LAN, Multi-label Packet Switching (MPLS) networks, telephony networks, wireless networks, optical networks, and any combination of the foregoing. Preferably, the communication network 100 is a packet-switched network or any type of network that uses addressing for packet, cell or frame delivery. Such networks include but are not limited to Asynchronous Transfer Mode (ATM) networks, Frame Relay networks, Hybrid fiber-coaxial (HFC) networks, and Synchronous Optical Network/Synchronous Digital Hierarchy (SONET/SDH) networks. The current design is for packet based networks, but the invention could be useful in other kinds of networks. Accordingly, the term "packet" should be understood as including conventional packets, such as IP and Ethernet packets, as well as cells and frames.

Figure 1:
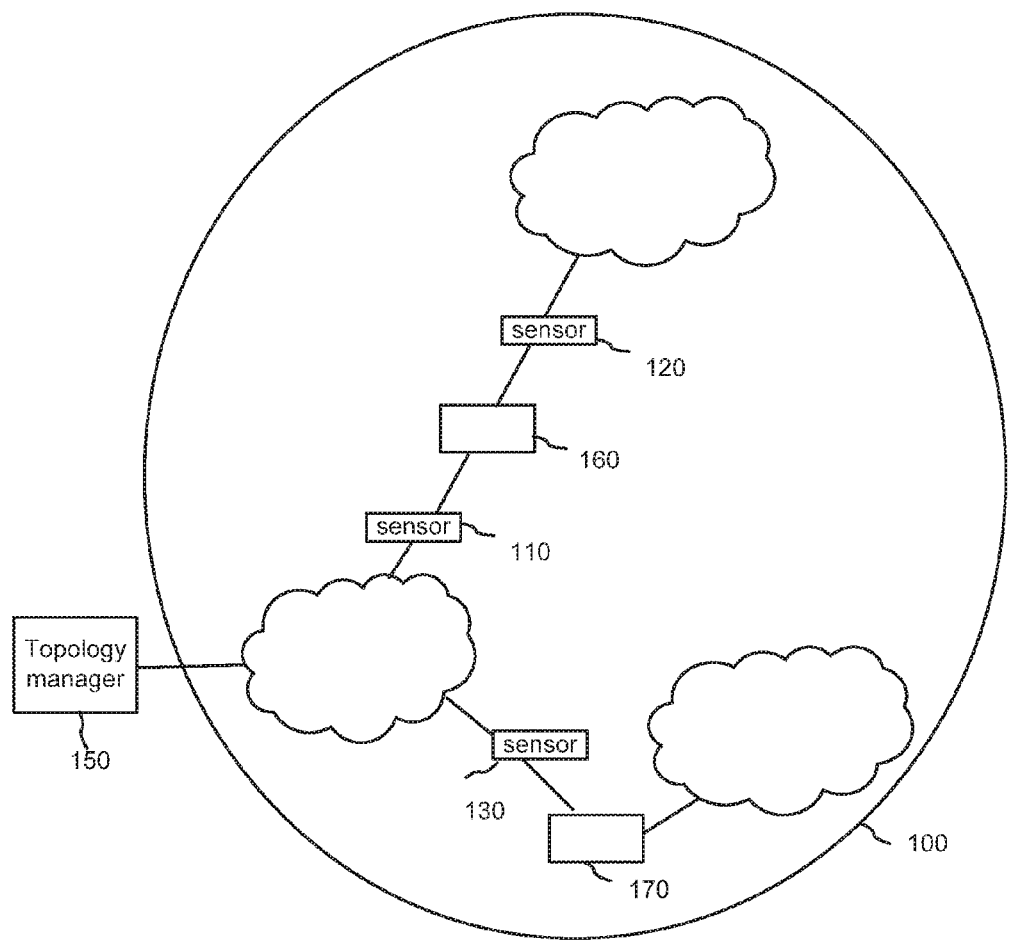
FIG. 1 is a schematic diagram of a test system.
Figure 2:
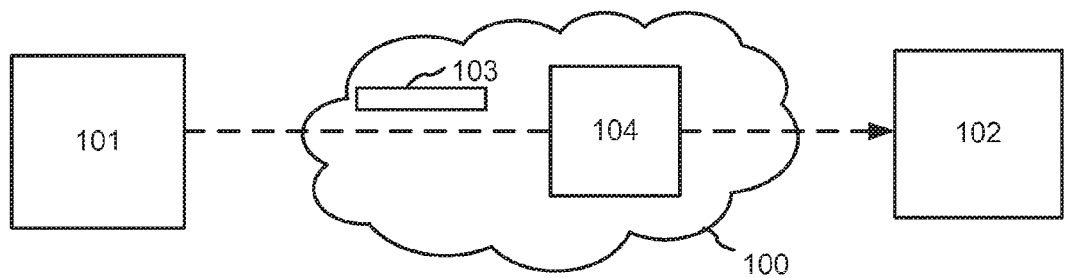
FIG. 2 is a schematic diagram of a test device connected inline in a network.

With reference to FIG. 2, a test device (sensor) 104, which represents the sensors shown in FIG. 1, is connected inline in a network 100 so that packets passing between at least two devices on the network, in this case between a data source device 101 and a destination device 102, pass through the test device 104. The test device 104 implements a method of network testing which may include passive monitoring, active testing, or a combination of both, as well as testing a subnetwork, link, or a device. By way of example, the test device 104 may be a transceiver plugged into a network device which is another device with respect to the transceiver.

The test device 104 may be a protocol-generic test device employed in the communication network 100 for monitoring packets sent across the network 100, such as a packet 103 being communicated in this illustrative example from the source 101 to the destination 102.

While only two devices 101 and 102 are shown as communicatively coupled via the communication network 100 in FIG. 2, it should be understood that any number of devices may be so connected. Further, while the device 101 is indicated as a source and the device 102—as a destination, it will be appreciated that communication may be bi-directional such that in some instances the device 102 is a source and the device 101 is a destination.

The sensor 104 may have or have not a network address. The topology manager 150 may employ the method which makes no use of addresses of test devices, treating them effectively as "unaddressed" (or "addressless") devices. Communication with an unaddressed test device relies on inspection of packets passing through the test device and comparing the content of the packets to a predetermined pattern as disclosed in U.S. Patent Application Pub. No. 20110283140 incorporated herein by reference. It is also possible that the sensor 104 has a network address, e.g. a MAC address.

The test device (sensor) 104 is connected inline in the network 100 and is capable of inspecting and/or capturing packets traveling from source 101 to destination 102 and examining the received packets. The test device 104 has one or more predefined authentication patterns stored therein, including an identification number (ID) of the test device and, optionally, patterns which allow the test device 104 to recognize, among the received packets, packets intended to the test device 104 and including information targeted to the test device 104.

In the example shown in FIG. 2, the packet 103 travels from the source 101 to the destination 102 and is intercepted by the test device 104.

The test device 104 may recognize the packet 103 as a special test/configuration packet by scanning for and finding a predefined pattern injected into the packet's payload by the source of the packet. For example, the packet 103 may include a pattern which indicates a command from the topology manager 150. The test device 104 examines received packets exemplified by the packet 103 in FIG. 2. If the packet 103 is not intended to the test device 104, i.e. the packet 103 includes none of the authentication patterns stored in the device 104, the packet 103 is forwarded to the destination address of the packet without any change to the packet 103.

Figure 3A:
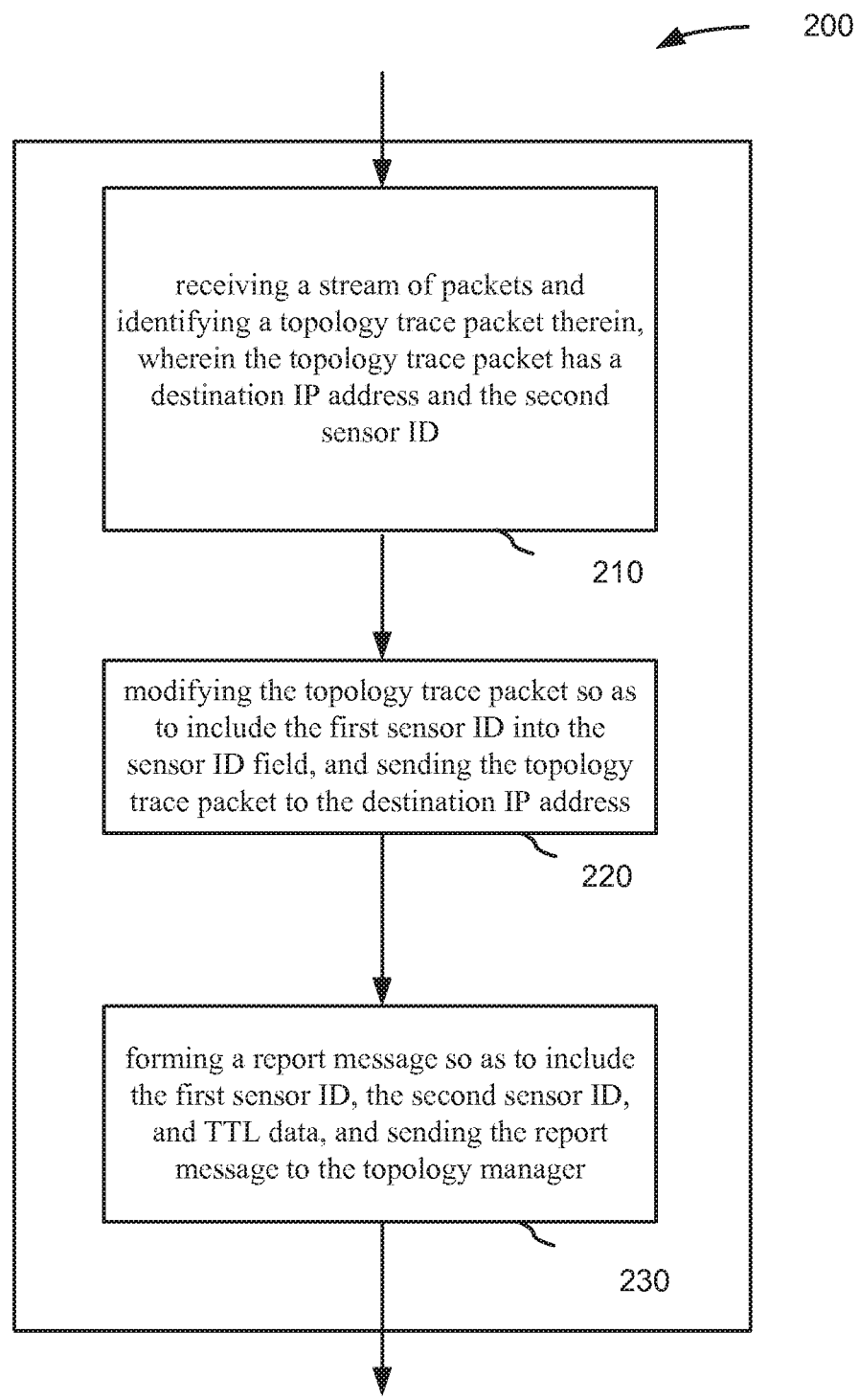
FIG. 3A is a flow chart of a method of collecting topology information.

FIG. 3A presents a flow chart of a method far collecting topology information by sensor devices connected inline in the network 100 and providing the topology information about the network to a topology manager 150, wherein the network includes a plurality of sensors each having a sensor ID. The method may be implemented in the sensors 110, 120, 130, and others within the network 100; the sensors provide the topology information to the topology manager 150.

With reference to FIG. 3A, the method 200, as performed at a particular sensor, includes a packet receiving step 210, when the sensor receives a stream of packets, examines every packet of the stream, and identifies a topology trace packet in the stream of packets. The topology packet is identified by the presence of a predetermined pattern in a predefined location of the packet, preferably in the payload; the pattern in the received packet should match one of the authentication patterns stored in the memory of the sensor.

For travelling in the network, the topology trace packet has a destination address, which is not necessarily the address of the test device. The sensor may be an unaddressed device and packets intended to the unaddressed device may have an address of a downstream device in the destination address field of the packet. The topology trace packet also includes a sensor ID of the previous sensor passed by the packet, in the payload of the packet, in a Last Sender field which should not be confused with a source IP address field and a MAC source field which are located in the header of the packet and contain different information. For consistency, the originator of the topology trace packet, the topology manager, has its own ID, shown as zero in an example below.

In a forwarding step 220, the sensor modifies the topology trace packet so as to include the sensor ID into the payload of the packet. Optionally, the value of the time-to-live (TTL) field is copied into the payload of the topology trace packet. The MAC addresses of the preceding and next network devices, i.e. the source and/or destination MAC addresses may also be copied from the header to the payload of the topology trace packet. Then, the modified topology trace packet is forwarded to the destination address which was present in the topology trace packet. Preferably, only the payload of the trace packet is modified at the sensor, whereas the header is not changed. Although the topology trace packet is modified at the sensor, where it does not cause confusion, we refer to the captured and modified packets as a same topology trace packet modified during its life cycle. Notably, the IP destination field stays unchanged while the packet travels through the network. The TTL field of the packet and MAC source and destination addresses are conventionally changed at routers, although the sensor preferably does not change these fields in the header of the topology trace packet. Preferably, the entire header is not changed at the sensor.

In a report step 230, the sensor device forms a report on the basis of the captured or modified topology trace packet. The report includes the sensor ID, as well as an ID of the previous sensor. Preferably, the report contains TTL-data based on the TTL value of the received topology trace packet for providing the topology manager with information about spatial relation between the first and second sensors. The report may constitute a single report packet, or may be fragmented into several packets. Network addresses of adjacent nodes may also be added to the payload of the report packet(s); e.g. the source and/or destination MAC addresses may be copied from the header of the trace topology packet received at the sensor to the payload of the report packet(s). Then, the sensor sends the report to the topology manager, possibly using the source IP address of the topology trace packet as the destination address of the report packet(s). The report packets may be sent to the topology manager over the network 100, or over a different network.

Both, the modified trace packet and the report message may include absolute values of the TTL field and/or decrements, i.e. the differences between the stored value of the TTL in the payload and the current value of the TTL The method 200 is preferably implemented using the Internet Protocol (IP); the destination address is the IP destination address, and the TTL field is within the IP header.

The method of collecting topology information 200 may be implemented in software in the form of a non-transitory computer-readable medium which includes computer program instructions that cause a computer to execute the method.

Figure 3B:
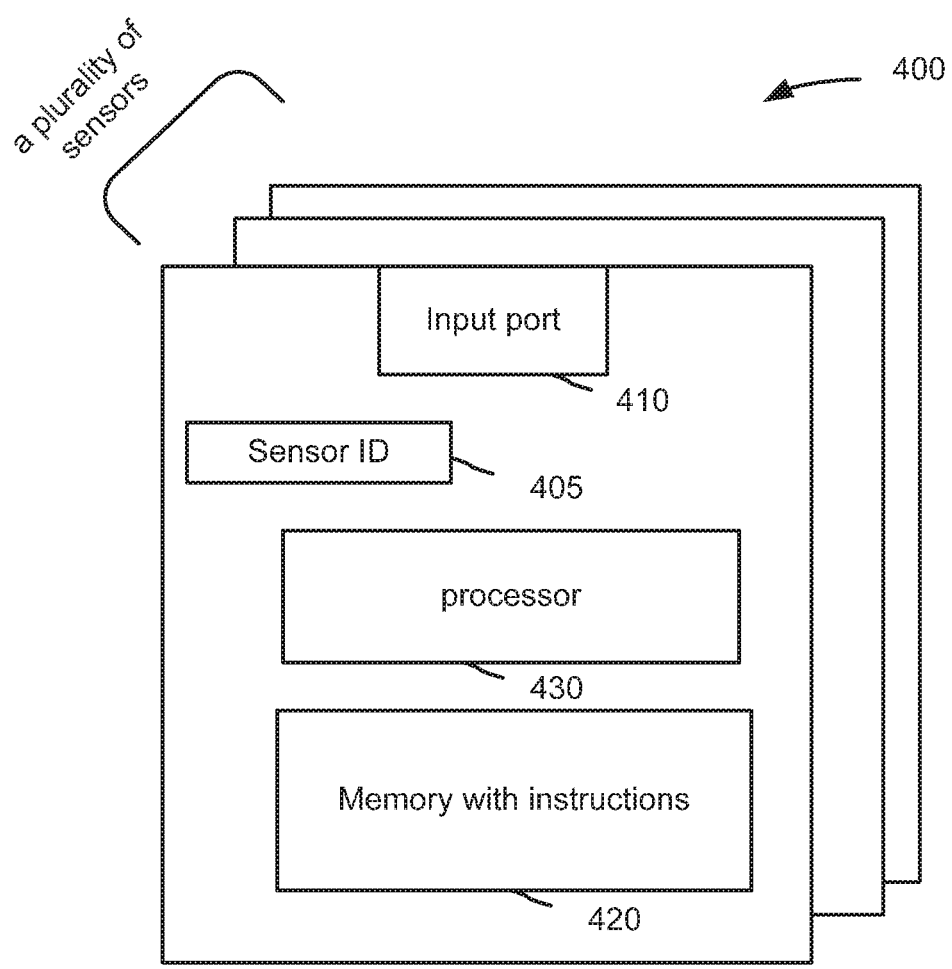
FIG. 3B is a schematic diagram of a system implementing the method of collecting topology information.

With reference to FIG. 3B, a system implementing the method of collecting topology information 200 includes a plurality of sensors 400, such as sensors 110, 120, 130, and 104. The sensors have sensor ID 405 stored therein. At least one sensor, and preferably each sensor, includes: an input port 410 for receiving a stream of packets; a tangible memory 420 with computer instructions stored therein; and, a processor 430 for executing the computer instructions and causing the sensor to (i) identify a topology trace packet in the stream of packets, wherein the topology trace packet has a destination address, (ii) include the sensor ID in the payload of the topology trace packet and send the topology trace packet to the destination address, (iii) form a report so as to include the sensor ID of the topology trace packet, as well as a sensor II) of the previous sensor traveled by the packet, and send the report to a topology manager.

In one embodiment, the topology trace packet may be appended at each sensor, adding data at each hop instead of overwriting it, so that the topology trace packet contains sensor IDs of sensors the topology trace packet has passed through. At selected sensors, possibly only at a final sensor, a report message is sent to the topology manager. The topology trace packet may indicate the final sensor wherefrom a report should be sent.

Figure 4:
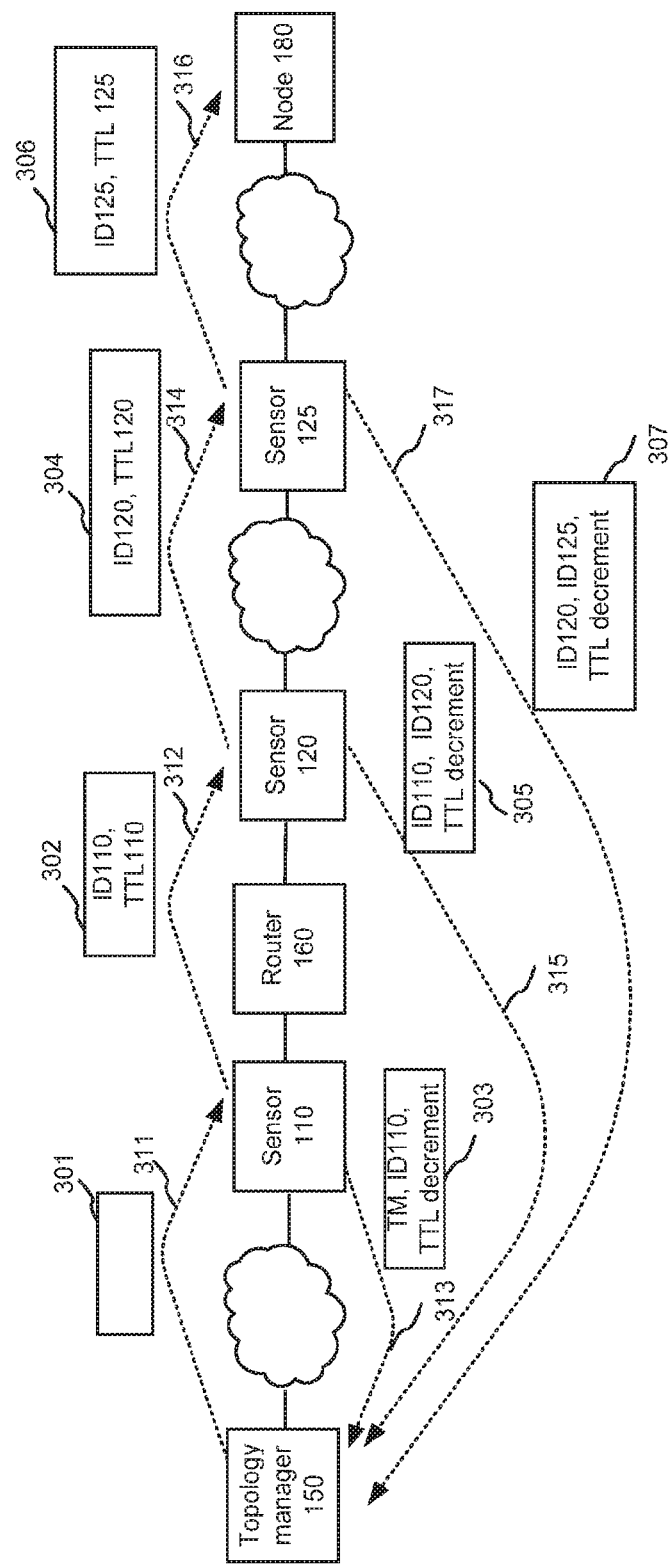
FIG. 4 is s a schematic diagram of a packet flow between a topology manager and sensors.

FIG. 4 illustrates the flow of packets between the topology manager 150 and sensors 110, 120, and 125. In this example, the topology manager 150 sends a topology trace packet 301 in the direction of a node 180 as indicated by an arrow 311; the destination IP address of the packet is the address of the node 180. If the packet 301 travels through the link wherein the sensor 110 is connected inline, the sensor 110 intercepts the trace packet 301 in the packet receiving step 210. Then, in the forwarding step 220, the sensor 110 modifies the packet 301 to include the sensor ID of the device 110; optionally, the TTL value is copied from the header of the topology trace packet 301 to the payload of the packet. The modified packet is shown as a packet 302. The sensor 110 sends the modified topology trace packet 302 in the direction of the node 180 as indicated by an arrow 312. In the reporting step 230, the sensor 110 forms a report message 303 which includes the sensor ID of the sensor 110, the ID of the topology manager. Optionally, the report message 303 includes the value of the TTL field from the trace packet 301 received at the sensor 110 or a TTL decrement. The report message 303 is sent to the topology manager 150 as indicated by an arrow 313. Preferably, the report packets are sent to the Topology manager in band; optionally—out of band.

The modified topology trace packet 302 traverses the router 160 which conventionally decrements the TTL value in the header of the packet 302 and sends the packet further in the direction of the node 180 as indicated by the arrow 312. The sensor 120 intercepts the topology trace packet 302 and further modifies it so as to include the sensor ID of the sensor 120 and the value of the TTL field in the header of the packet 302 when it was intercepted by the sensor 120 into the payload of a modified topology trace packet 304, which has a same destination address of the node 180 as the previous modifications of the topology trace packet indicated with numerals 301 and 302. The sensor 120 forms a report message 305 which includes the sensor ID of the sensor 120, the ID of the previous sensor 110, and the value or decrement of the TTL field from the trace packet 302 received at the sensor 120. In other words, the sensor 120 performs the same method steps 210-230 as does the sensor 110; later the same steps are performed by a next sensor 125 which receives the modified trace packet 304 with payload modified by the sensor 120 and the TTL field in the header of the packet conventionally decremented by routers along the path of the packet. The sensor 125 adds its own ID to the payload of a modified topology trace packet 306 and to a report packet 307 sent to the topology manager as indicated by the arrow 317; the modified topology trace packet 306 is sent further in the direction of the node 180 as indicated by the arrow 316.

Performing the method steps 210 through 230 at each sensor results in that the topology trace packet sent by the topology manager 150 in the direction of the node 180 collects information about the sensors along the way, i.e. the topology trace packet is modified so that its payload contains information about sensors the packet has passed through; at least information about one previous sensor which the trace packet has passed. Preferably, the network metrics is also collected, so that report packets contain TTL-related values, either in the form of absolute TTL values, or TTL decrements which reflect distances between two sensors. In case the trace topology packet contains the TTL value which the trace packet had at a previous sensor the trace packet has passed through before arriving at the current sensor, the report message sent from the current sensor to the topology manager may include the TTL decrement between the two sensors as well as their sensor IDs. Alternatively, the report message may include the absolute TTL value at the current sensor, and sensor IDs of the current and previous sensors, so that the topology manager could calculate the distance between the sensors (in hops). Some network elements may not decrement the TTL and may not change the destination MAC address. If the element has more than one output port populated with a sensor, the topology manager will know that the network element is there but may not have specific information to identify it.

Notably, the method works with a single topology trace packet, albeit modified along the way, travelling in a certain direction. In comparison, the method of active probing requires sending multiple trace packets with ever increasing initial TTL value so that routers would send back error messages when the TTL reaches zero. Not only active probing initiates massive traffic, it relies on reporting from the routers which may be turned off. The method of collecting topology information with the help of sensors as disclosed in this application has the advantage of reduced traffic and does not rely on configuration of routers managed by a third party.

Figure 5:
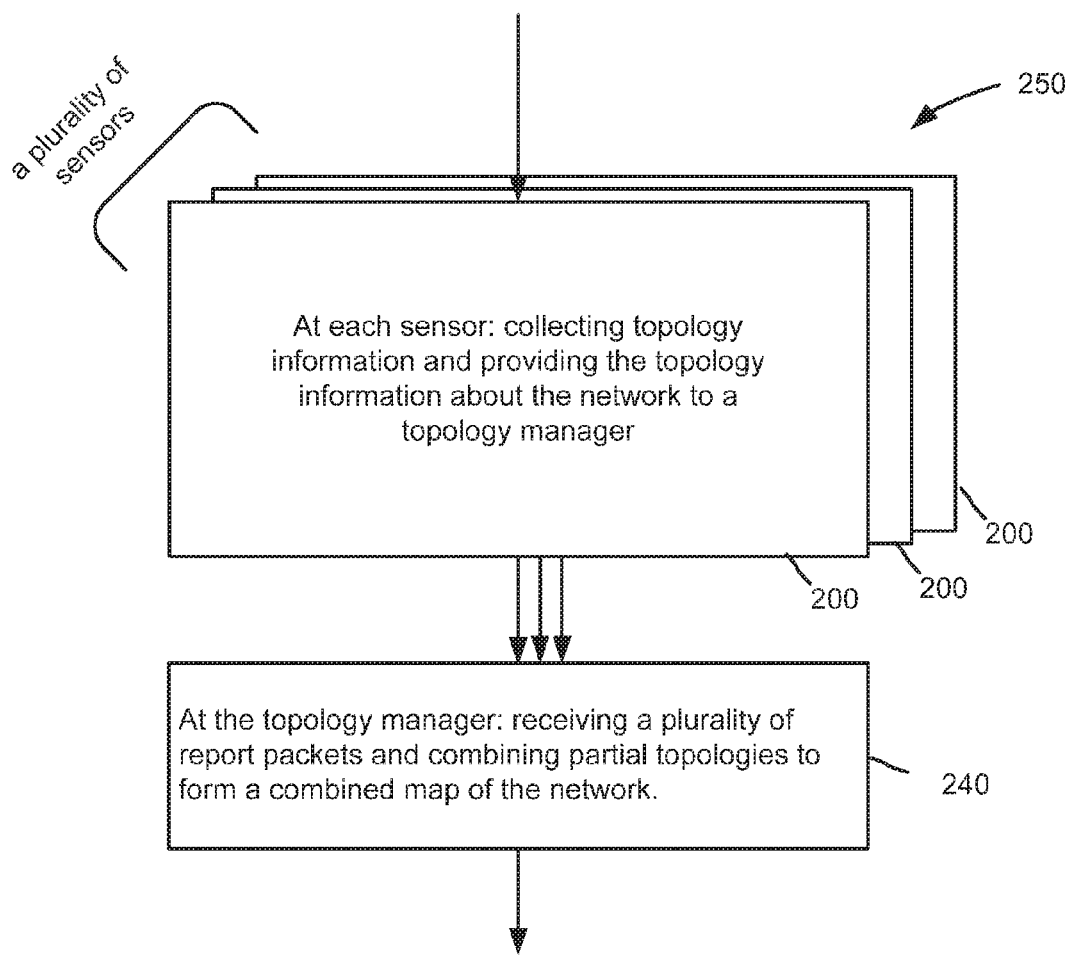
FIG. 5 is a flow chart of a topology discovery method.

With reference to FIG. 5, the aforedescribed method of collecting topology information 200 may be a part of a topology discovery method 250. In a collecting topology information step 200, a plurality of sensors connected inline in a network collect topology information about the network and provide the topology information to a topology manager as describes above with reference to FIG. 3A. The topology manager constructs a partial topology of the network based on the source and destination MAC addresses of packets captured at a particular sensor having a sensor ID. The sensor IDs, and preferably the TTL-related values, are used for combining partial topology representations together on the basis of the information found in the report messages. Thus, the topology manager uses the information received in reports to update the partial topology representations, and/or for constructing a plurality of partial topology representations and combining them into a combined topology representation of the network.

The topology discovery method 250 may be implemented in software in the form of a non-transitory computer-readable medium which includes computer program instructions that cause a computer to implement the method.

Figure 6:
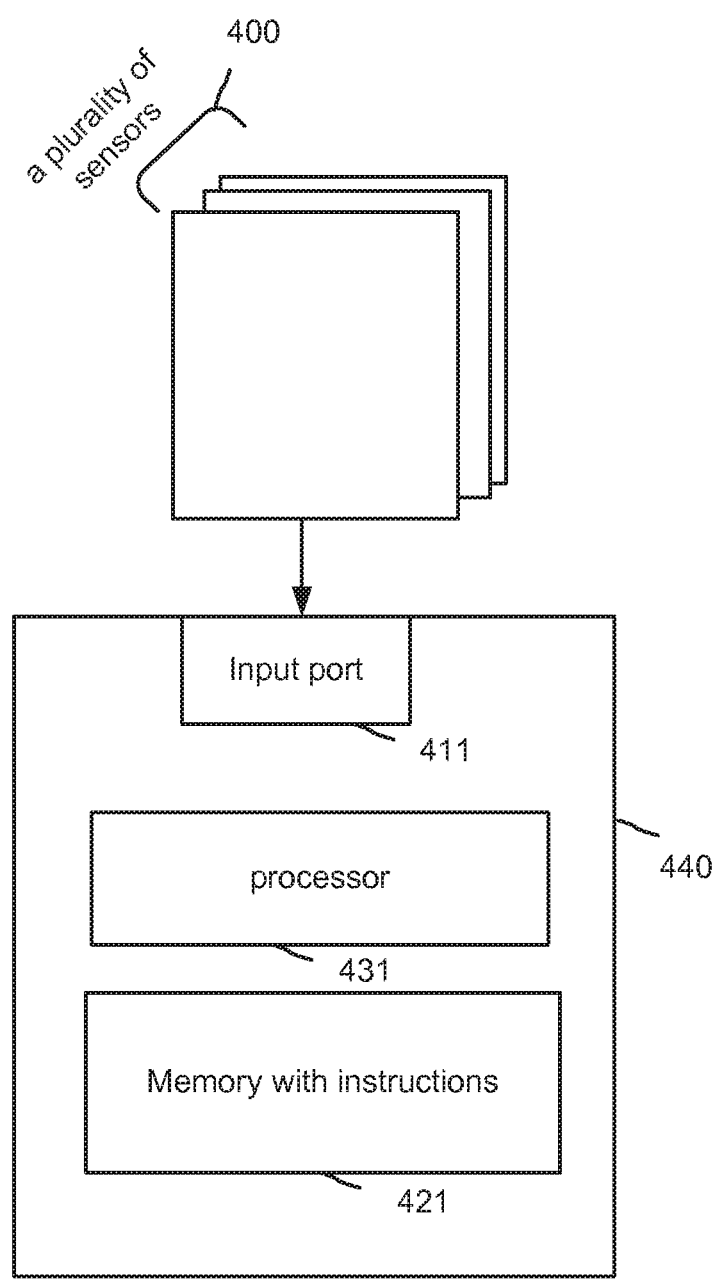
FIG. 6 is a schematic diagram of a system implementing the topology discovery method.

With reference to FIG. 6, a system implementing the topology discovery method 250 includes the plurality of sensors 400 and a topology manager 440 which includes an input port 411 for receiving a plurality of reports; a tangible memory 421 with computer instructions stored therein; and, a processor 431 for executing the computer instructions and causing the topology manager to form a topology representation of the network based on the sensor IDs obtained from the reports and on MAC addresses of adjacent nodes obtained from the packets captured at the sensors.

The components of the test device may be implemented in a combination of software and hardware such as an Application Specific Integrated Circuit (ASIC), Field programmable Gate Array (FPGA), network processor, system on a chip such as an FPGA with integrated ARM or micro processor, Complex Programmable Logic Device (CPLD), Erasable programmable logic device (EPLD), Simple programmable logic device (SPLD), or macrocell array. The memory components 420 and 421 may be any non-volatile memory such as an Electrically Erasable Programmable Read-Only Memory EEPORM, flash memory, Ferroelectric RAM, application-specific integrated circuit (ASIC), any writable memory known and unknown or combination thereof.

The method of collecting topology information 200 may further include capturing control packets conforming to selected control protocols, and sending the captured control packets, or at least portions thereof, to the topology manager. The selected control protocols may be ICMP Router Discovery Protocol (IRDP), Link Layer Discovery Protocol (LLDP), Logical link control protocol (LLC), Cisco Discovery Protocol, Link Aggregation Control Protocol (LACP), Port Aggregation Protocol (PAgP), or Enhanced Interior Gateway Routing Protocol (EIGRP). The term "control packet" is understood broadly as any packet used for control, discovery, routing, etc. and containing topology information about the network.

Intelligent packet sensors IPSs may be employed to determine specifics of a network topology by using information that can be extracted from packets that pass through IPSs on the network for building the topology. The sensors may provide network addresses of adjacent nodes to the topology manager by capturing a plurality of packets at the sensor, sending a copy of each of the plurality of packets to the topology manager, directly or indirectly, while forwarding the plurality of packets to their destination addresses.

A sensor (IPS) may capture specific packets that pass through it. The packets are shipped to the topology manager or to a control processor which forwards the captured packets or parts thereof to the topology manager. Data collected is preferably directional in that each captured packet is marked as captured on the network or equipment side. For some packets it is known that all of the devices represented by network addresses, e.g. MAC addresses, in the captured packets are one hop from each other with the IPS in between. The IPS may ship each captured packet to the central collection point, e.g. to the topology manager 150, as the packet is captured. Depending on the packet captured, collected data may include the neighboring devices MAC address, IP address, port names, device names, etc.

Each IPS may capture topology trace packets as discussed above. The topology trace packet contains the ID of the previous IPS that it has passed through. This packet will be sent back to the topology manager, which may be part of a packet routing engine (PRE), as well as modified and sent on toward its egress destination. The IPS will add its own ID, and optionally a copy of the TTL from the packet header to the data potion of the packet before sending it on toward its destination. The difference in TTL between IPSs can be used to determine location of the IPSs relative to one another in the network. This relative location can be used to link the MAC/IP data together into a larger topology representation (map).

At the topology manager, the captured packets may be parsed to determine relationships between network equipment. If two IPSs see the same MAC address, they are in the same segment. Two IPSs that are one hop distant from each other are, effectively, plugged into different ports in the same router. There are variations on this that will be discussed in the details later in this document. Preferably the method of collecting topology information about the network includes, at each participating sensor, providing network addresses (e.g. MAC addresses) of adjacent nodes to the topology manager. This information is added to the topology of the skeleton subnetwork formed by the sensors. In other words, the topology of the skeleton subnetwork formed by the sensors may be used to combine partial topologies formed by an IPS and close neighborhood. The term "map" or "topology representation" should be understood as interrelated topology data, e.g. in the XML form, graphical representation of the data is also possible.

As discussed above, the IPSs can collect 1st hop MAC addresses from any packet that passes through it. Additionally, the sensors may collect data e.g. from IMP Router Discovery Protocol, IRDP Advertisement Messages. These messages generally contain both the MAC address and IP address of an interface. Link Layer Discovery Protocol and Cisco Discovery Protocol messages may also be captured. They can contain MAC and IP addresses and more specific equipment data.

ICMP Router Discovery: The IPS may collect dynamic router ICMP Router Discovery advertisements. Typically, routers advertise every 10 minutes. For more efficient mapping, the IPS may send an ICMP Router Discovery solicitation message which routers will respond to with an advertisement. The solicitation packet is a predefined packet without any specific information for the IPS that issues the solicitation. This packet will be sent to the IPS from the PRE or topology manager and sent out using packet injection as disclosed in U.S. Patent Application Pub. No. 20110305150 incorporated herein by reference. The entire ICMP router advertisement may be sent back to the topology manager. While no explicit time is set for the routers to advertise after a solicitation is received, the request is for an immediate reply and the request may be repeated after 1 second and then repeated again after 2 seconds with retry occurring each time after twice the period. Typically, the max retries is 3. The total time for the collection of advertisements would be as little as 1 second and as long as 10 seconds. The repeat timing would be controlled by the topology manager by sending another packet injection. FIG. 7 presents some related packet formats.

MAC only discovery: Some routers may have the advertisement set to not include the IP address. In these instances sensors collect only the MAC address. Other devices may not respond to the solicitation. The sensors collect these devices MAC addresses from the Ethernet header of passing traffic. These can be collected from packet headers continuously returned to upkeep egress addresses for the discovery process.

Link Layer Discovery Protocol (LLDP) data, where enabled, can be used to determine more specifics of the routers neighboring an IPS. The LLDP packets are broadcast at 30 second intervals, default, by enabled routers to advertise themselves. The packets may contain more specific equipment data including: Chassis Information (Name, Alias, MAC, IP), Port Information (Description, Name, Alias, MAC, IP) and System Name.

Cisco Discovery Protocol (CDP) data can be used to determine more specifics of the routers neighboring an IPS. The CDP packets are broadcast at 60 second intervals, default, by enabled routers to advertise themselves. The packets may contain more specific equipment data including: Device ID, Port ID, Platform Name, MAC, IP addresses.

In one embodiment, the sensors collect all MAC addresses that are within one hop of each other on either side of the sensor; where possible, IP addresses are also collected. The topology manager uses a Command Channel to send a filter command to each sensor (IPS) to set a filter for collecting topology trace packets. The IPS will react to the filter command by setting the filter. A second command will be sent to initiate a specialized topology component in the IPS to start topology filtering and perform the method 200 which includes obtaining topology information and providing that information to the topology manager. The command may include a timeout value for the component. The timeout is dependent on the structure and depth of the network.

Preferably, the topology manager sends IPS topology trace packets to each IPSs egress address known to the topology manager, e.g. using the list of addresses collected by the sensor (IPS) and provided to the topology manager and/or PRE as disclosed in U.S. Patent Applications Pub. Nos. 20110305150, 20110283140, and 20110305149 incorporated herein by reference. The topology manager may be a part of the PRE or a separate component in communication with the PRE.

Each message is sent to an egress device address in the form of topology trace packet. As the packet passes through an IPS, the IPS will capture the packet using the previously set topology filter. The topology trace packet may be identified by the presence of a predetermined pattern in the packet, and/or using the IP address of the topology manager, and/or by an IPS broadcast ID in the UDP payload; the packet size also may be checked to avoid mismatches.

After the topology trace packet is captured, it is sent as a filter result back to the topology manager in the form of the report message. The IPS topology trace component also modifies the packet and forwards it on toward its destination egress address. The IPS topology trace component replaces or appends existing data in the packet payload with its own ID and the current TTL of the packet. It will then send the modified packet on toward its destination.

The flow of trace messages is illustrated in the example below.

(1) The topology manager (TM) sends Topology Trace packet with some large TTL value:

| Ethernet | IP TTL(255) | UDP | IPS Broadcast ID | Topology Trace flags for filter | Last IP TTL(255) | Last Sender (0 == TM) | Last Sender Dest MAC (or 0) |
| --- | --- | --- | --- | --- | --- | --- | --- |

(2) Packet is received by IPS A. Note the IP TTL, the packet has gone through 5 hops:

| Ethernet | IP TTL(250) | UDP | IPS Broadcast ID | Topology Trace flags for filter | Last IP TTL(255) | Last Sender (0 == TM) | Last Sender Dest MAC 6 bytes |
|---|---|---|---|---|---|---|---|

(a) IPS A sends the captured packet back to the topology manager as a filter result packet. The result/report message includes the sensor ID of the IPS A, as well as copies the Last Sender field from the received packet, which in this example indicates the topology manager (0). The result may include TTL data from the captured topology trace packet. The TTL value from the captured packet may be added to the payload of the report packet(s) in the Last IP TTL. Alternatively, the report may include the difference between the Last IP TTL field and the IP TTL field of the received packet, which is five hops in this case and indicates the distance between IPS A and the topology manager.

(b) IPS A modifies the topology trace packet by copying the TTL from the IP header field to the LAST IP TTL field, puts its ID in the Last Sender field, replaces the Last Sender Dest MAC address with the Destination MAC from the Ethernet header and sends the packet on:

| Ethernet | IP TTL(250) | UDP | IPS Broadcast ID | Topology Trace flags for filter | Last IP TTL(250) | Last Sender (ID of IPS A) | Last Sender Dest MAC 6 bytes |
|---|---|---|---|---|---|---|---|

(3) Packet is received by IPS B. Note the IP TTL, the packet has gone through one more hop:

| Ethernet | IP TTL(249) | UDP | IPS Broadcast ID | Topology Trace flags for filter | Last IP TTL(250) | Last Sender (ID of IPS A) | Last Sender Dest MAC 6 bytes |
|---|---|---|---|---|---|---|---|

(a) IPS B sends the captured packet back to the TM as a filter result packet. The result/report message includes the sensor ID of the IPS B, as well as indicates the last sender, IPS A. The result packet preferably includes the difference between the Last IP TTL field and the IP TTL field, which is one hop in this case and indicates the distance between IPS A and IPS B.

(b) IPS B modifies the topology trace packet by copying the TTL from the IP header field to the LAST IP TTL field, puts its ID in the Last Sender field, replaces the Last Sender Dest MAC address with the Dest address from the Ethernet header and sends the packet on:

| Ethernet | IP TTL(249) | UDP | IPS Broadcast ID | Topology Trace flags for filter | Last IP TTL(249) | Last Sender (ID of IPS B) | Last Sender Dest MAC 6 bytes |
|---|---|---|---|---|---|---|---|

(4) Packet reached the destination and dies. Two results have gone back to TM.

The topology manager parses the report message to get source and destination MAC from the outermost Ethernet header and TTL from the outer most IP header. It also parses the Last TTL and last Sender IPS and Dest MAC address from the UDP packet payload. This info along with the capturing IPS ID is shipped to the topology manager.

Note that the hop count will be reflection of the customer's network. In the case where the packet passes through a carrier MPLS segment the TTL may not be decremented and the carrier's network segment may be seen as a single hop.

Link Aggregation Control Protocol

Two switches that comprise a LAG, with LACP enabled, will exchange LACPDU packets on a 1 or 30 second interval. The LACPDU identifies whether the link is active in the LAG and can be used to construct the LAG ID. The LACPDU is an LLC packet.

A filter may be set to capture LACPDU traffic and left active for 60 seconds. This will insure that if the IPS is on an aggregate-able link it will capture a LACPDU. The LACPDU will be sent to the PRE topology component for parsing. The format of the LACPDU is shown in FIG. 8.

The LACPDU can be used to determine if an IPS is on a link that is currently participating in a LAG by examining the Actor State Activity bit, bit 0. If enabled, a LAG ID can be constructed as in the example below:

The LAG is between Partner SKP and Partner TLQ, wherein S & T are system identifiers, K & L are operational Keys, P & Q are port identifiers.

System Parameters (S, T) System Priority=0x8000 System Identifier=AC-DE-48-03-67-80 System Priority=0x8000 System Identifier=AC-DE-48-03-FF-FF Key Parameter (K, L) Key=0x0001 Key=0x00AA Port Parameters (P, Q) Port Priority=0x80 Port Number=0x0002 Port Priority=0x80 Port Number=0x0002

The complete LAG ID derived from this information is represented as follows, for an individual link:

[(SKP), (TLQ)]=[(8000,AC-DE-48-03-67-80,0001,80,0002), (8000,AC-DE-48-03-FF-FF,00AA,80,0002)]

The corresponding LAG ID for a set of Aggregateable links is represented as follows:

[(SKP), (TLQ)]=[(8000,AC-DE-48-03-67-80,0001,00,0000), (8000,AC-DE-48-03-FF-FF,00AA,00,0000)]

The difference between the two representations is that, for an Aggregate-able link, the port identifier components are zero.

The LAG ID will be constructed, by the PRE, for any IPS that reports a LACPDU and the Actor_State Activity bit is 1.

Port Aggregation Protocol (PAgP) may be used to determine if IPSs are located within the same LAG. The two switches that comprise the LAG, with PAgP enabled, will exchange PAgP packets on a default 60 second interval. The PAgP packet identifies whether the link is active in the LAG. The PAgP is an LLC packet. A filter will be set to capture PAgP traffic and left active for 60 seconds. The PAgP packet contains a Local Device ID and the Partner Device ID that can be used much like the LACP Lag ID to determine if two physical links are part of the same LAG. Note that if neither LACP nor PAgP are running, the LAG will not be detectable by the IPS and the topology manager will need to rely on user data for this determination.

The sensor sends all captured data to the topology manager as individual filter result packets. IRDP Data includes: MAC address found in the Ethernet Header of the ICMP packet and IPs associated with the MAC found in the ICMP advertisement data, and IP address (if available). LLDP/CDP data includes: MAC, IP address (if available) and specific router info. IPS Topology Trace data (the report message) contains the following: ID of an previous IPS, Destination MAC as seen by that IPS, Source MAC as seen by the current IPS, the number of hops between the MACs. LACP/PAgP data includes: Device IDs to identify a lag, and Lag Active Flag.

The topology manager receives data as it is collected. The topology manager builds an data element for each IPS with collected data as shown below.

Figure 9:
FIG. 9 is a schematic diagram of a test device connected inline in a network.
Figure 10:
FIG. 10 is a partial topology map representing the combination shown in FIG. 9.

Relative to FIG. 9, a sensor (IPS) is connected inline between two network devices, each having a MAC address. The packets collected at the IPS identify both devices by their MAC addresses M1 and M2. Other information such as IP, chassis name, etc. may be available depending on the protocols used in captured packets. The IPS captures a packet sent from M1 to M2 and sends it to the Topology Manager. The Topology Manager would record MAC M1 a source address MAC M2 as a destination address; it would also record the side on which the packet was captured, network vs. equipment. FIG. 10 represents a partial network map which may be obtained from the information captured at the IPS shown in FIG. 9.

Figure 11:
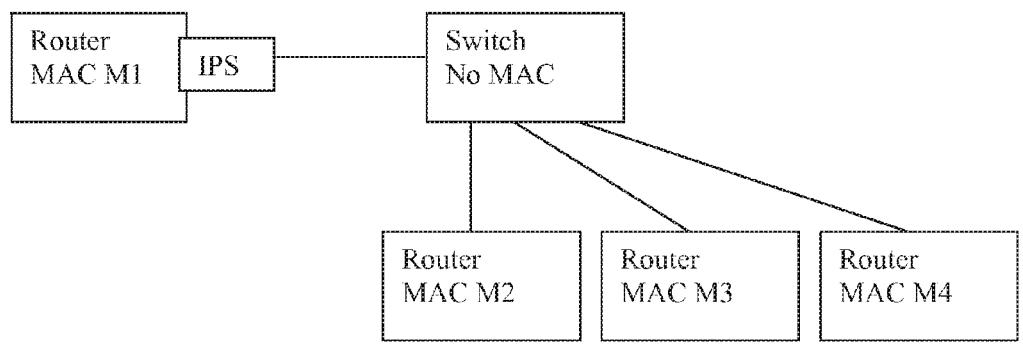
FIG. 11 is a schematic diagram of a test device connected inline in a network.
Figure 12:
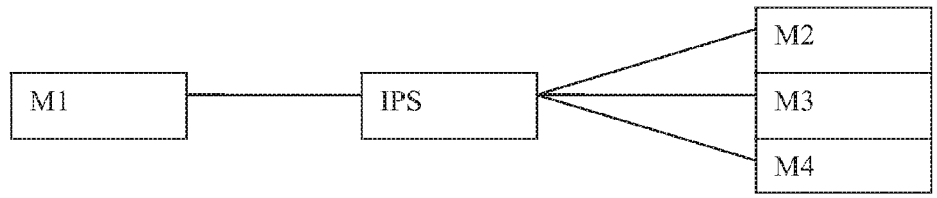
FIG. 12 is a partial topology map representing the combination shown in FIG. 11.
Figure 13:
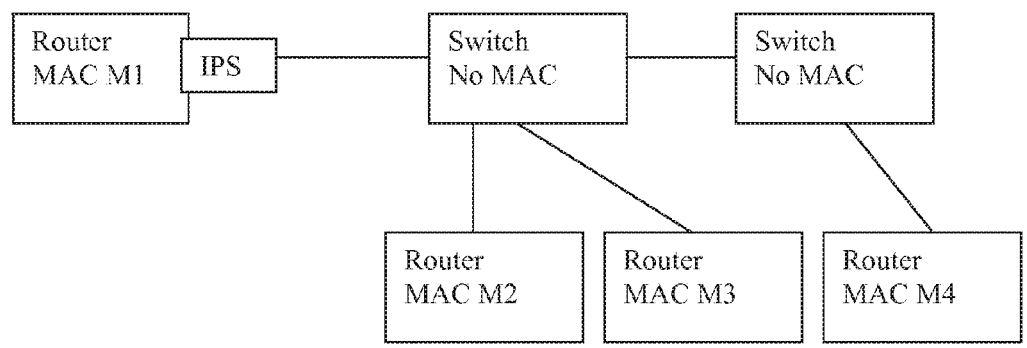
FIG. 13 is a schematic diagram of a test device connected inline in a network.
Figure 14:
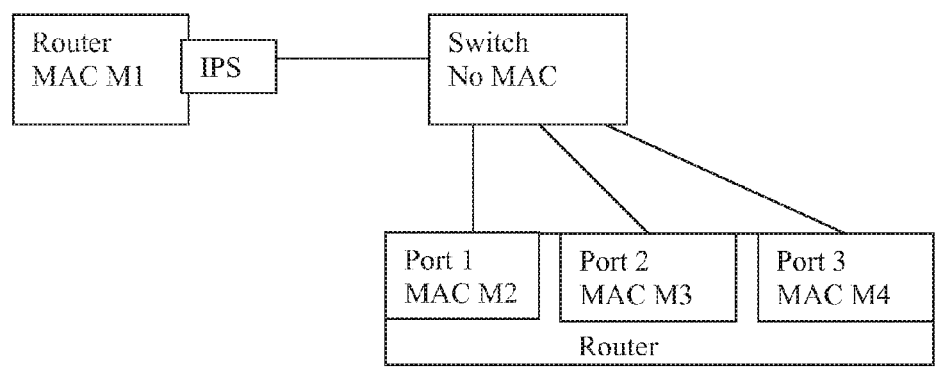
FIG. 14 is a schematic diagram of a test device connected inline in a network.

With reference to FIG. 11, a sensor (IPS) may have a MACless device, e.g. a switch, on one end of the connection. Then the sensor would see all the MAC addresses beyond the MACless device, i.e. packets captured at the sensor would reflect each of the paths through the IPS. FIG. 12 represents a partial network map which may be obtained from the information captured at the IPS shown in FIG. 11. Notably the map (FIG. 12) lacks the switch shown in FIG. 11 since the switch has no MAC and the IPS has no way of knowing if there are one or more elements between the IPS and the Routers M1 and M2, M3, and M4. For example, network layouts shown in FIG. 13 and FIG. 14 also have the partial map shown in FIG. 12. In FIG. 13 the switch is connected to separate routers, whereas FIG. 14 shows a router partitioned to represent different subnets.

Figure 15:
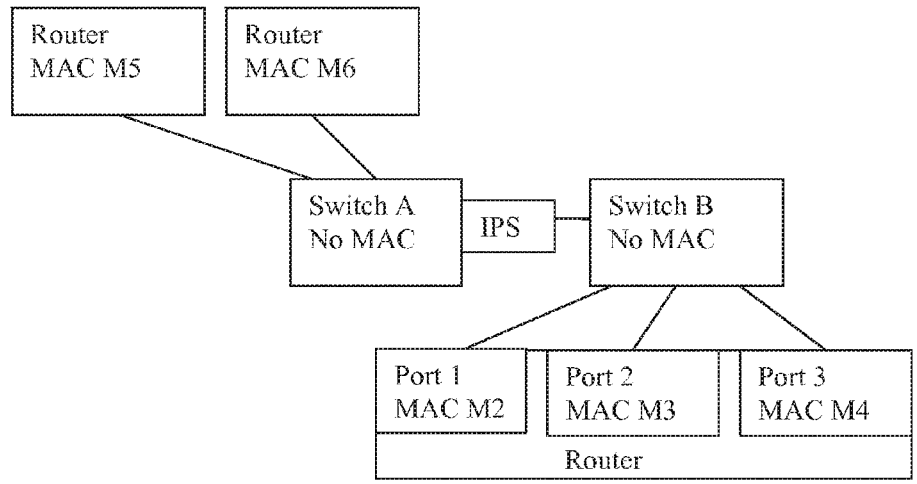
FIG. 15 is a schematic diagram of a test device connected inline in a network.
Figure 16:
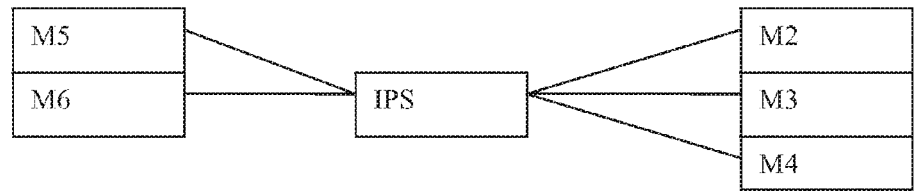
FIG. 16 is a partial topology map representing the combination shown in FIG. 15.

Switches or multiple MACs per port may also appear on the other side of the IPS as shown in FIG. 15. FIG. 16 represents a partial network map which may be obtained from the information captured at the IPS shown in FIG. 15. Note that neither switch shows in the map. The switch in this instance represents any network element that does not have a MAC address and would therefore not show explicitly. However, the presence of one or more unaddressed devices may be inferred.

The topology manager may obtain MAC addresses on both sides of a sensor by analyzing packets captured at the IPS and forwarded to the topology manager. Alternatively, the IPS may analyze the captured packets and report the adjacent MAC addresses to the topology manager.

The partial topology maps shown in FIGS. 10, 12, and 16 may be combined using the information about the relative positions of the sensors obtained using the topology trace packets as discussed above. Employing the topology data collecting method 200, an IPS examines trace packets from other IPSs that pass through it. The IPS collects information about one or more of the traversed IPSs. The data may include IPS ID, adjacent MACs, and hop information. The data may be supplied to the topology manager for use in ordering the network topology.

Additionally, sensors may capture "control" packets as discussed above and thus provide the topology manager with additional information e.g. about regions which have no IPSs, so called "black box" areas.

Figure 17:
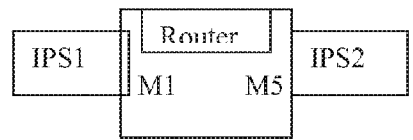
FIG. 17 is a schematic diagram of two test devices in a network.

With reference to FIG. 17, a topology discovery message (also referred to as a topology trace packet) travels from IPS1 through MAC M1 to MAC M2 in the router then through IPS2 towards its destination. IPS1 adds its ID and copies the destination MAC from the Ethernet header destination MAC to the data area to the packet before forwarding it. It also copies the current TTL from the packet header into the data area. IPS2 will capture the incoming packet and send it to be collated with the other returned packets. In this case the delta between the two TTL values is one, therefore M1 and MS are effectively in the same router. Notice that the absolute value of the TTL is not relied upon, but only the TTL delta between 2 IPSs is used. This means the method does not rely on the TTL being correct for the network in general, it only relies on each routing element decrementing it properly. Elements that decrement the TTL and/or modify the MACs in the Ethernet header constitute a hop.

Figure 18:
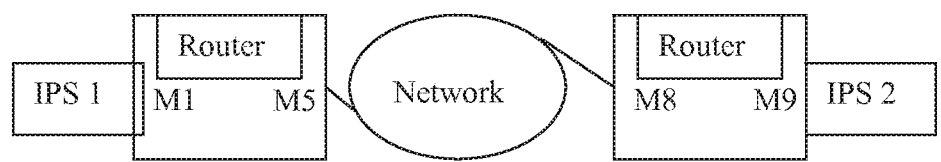
FIG. 18 is a schematic diagram of two test devices in a network.

In the network, some interfaces such as shown in FIG. 18 do not have IPSs installed therein. In this case, the topology manager still can determine that there is a path from M1 to M9; although the specific links may be not determined.

The topology data collected by the sensors may be used to build a topology representation (map). This map will represent the total known topology of the system as seen by the existing IPSs. The maps discussed herein are meant to be illustrative of the available relationships and are not the only possible representations of the topology data. Note that only MAC addresses are used to build the relationships in the neighborhood on a single IPS. Other collected data may also be reported and used to identify individual hardware components. The maps are built based on source and destination MAC addresses and the side they are captured on, network vs. equipment. The partial topology representations (maps) may be combined using the topology of the skeleton subnetwork of sensors.

Figure 19:
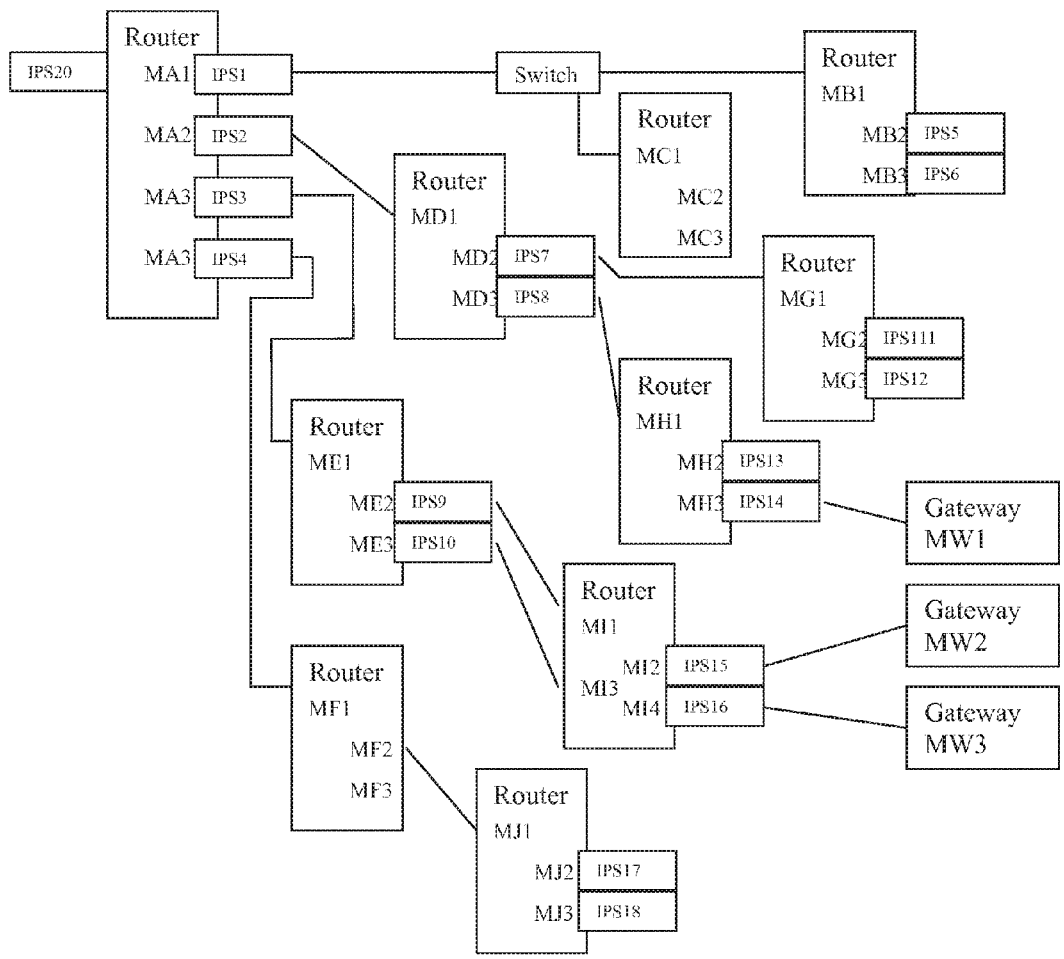
FIG. 19 is a schematic diagram of a portion of a network.
Figure 20:
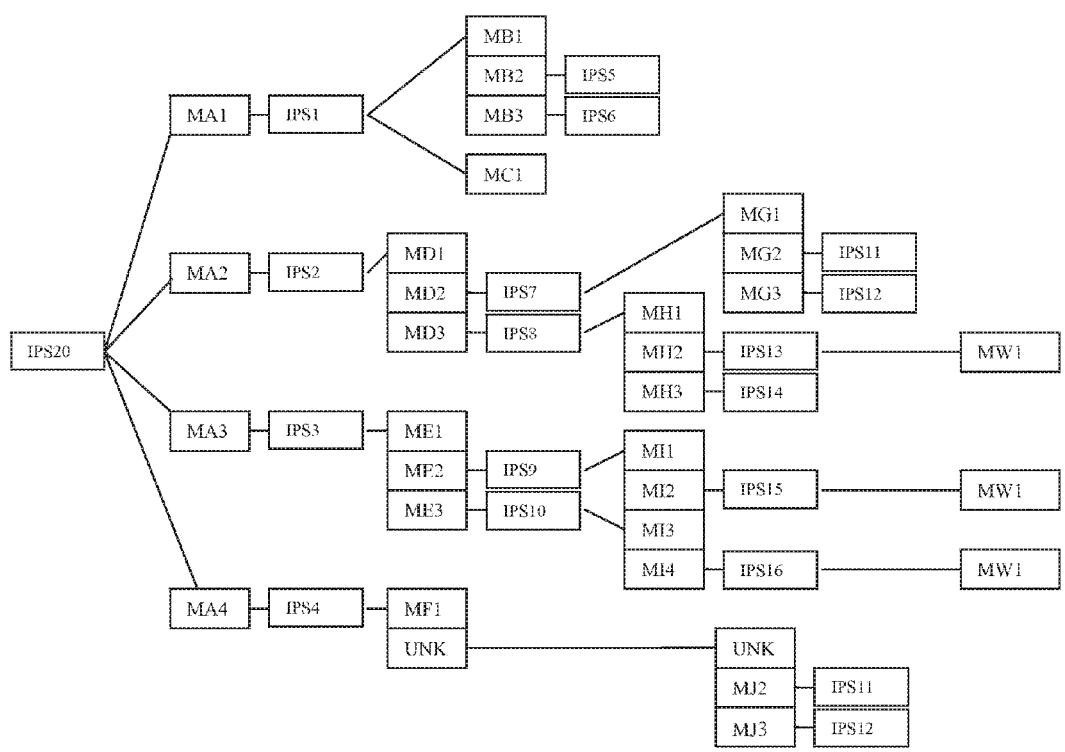
FIG. 20 is a combined topology map representing the combination shown in FIG. 19.

By way of example, the map shown in FIG. 20 represents the network shown in FIG. 19. With reference to FIGS. 19 and 20, the following observations can be made:

Whether ports are grouped together, depends on whether there is an IPS, or the topology manager, directly ingress of them. By way of example, IPS20 provides information to the topology manager that ports MA1 through 4 are in a same device.

The topology manager can determine that MB1, MB2 and MB3 are in the same router because MB1 was collected through Router Advertisement from IPS1, MB2 was collected through Router Advertisement from IPS5, MB3 was collected through Router Advertisement from IPS5, and the three were found to be one hop apart through a Smart Optics Topology message.

The topology manager "knows" nothing about most of the ports in the MC router: MC1 was collected through Router Advertisement from IPS1; there are no IPSs egress of the other MC ports and there for no way to get information about them.

The switch shown in FIG. 19 is not represented in the map in FIG. 20 since the switch has no MAC and does not count as a hop. Since IPS1 does not split the output, the topology manager may determine that there is at least one other device.

The links between ME2/MI1 and ME3/MI3 represent a LAG.

There is no information about all the ports in the MF or MJ routers as there is no IPS connecting them, but the topology manager may determine a direct connection between MF and MJ by counting hops and using the Last Sender Dest MAC and SRC mac from the packet header captured at IPS11 and IPS12.

In the description above, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

We claim:

1. A method comprising:
   identifying, by a sensor, a topology trace packet;
   modifying, by the sensor, a payload of the topology trace packet to include a sensor identifier, of the sensor, without modifying a header of the topology trace packet; and
   sending, by the sensor and after modifying the payload of the topology trace packet, the topology trace packet in a direction of a node identified by a destination address of the topology trace packet.

2. The method of claim 1, further comprising:
   receiving a stream of packets,
      where identifying the topology trace packet comprises:
         identifying the topology trace packet in the stream of packets.

3. The method of claim 1, further comprising:
   identifying a pattern in a particular location of a packet,
      where identifying the topology trace packet comprises:
         determining that the packet is the topology trace packet based on identifying the pattern in the particular location of the packet.

4. The method of claim 3, where the particular location is a location associated with the payload of the topology trace packet.

5. The method of claim 3, where the pattern is one of a plurality of authentication patterns stored in a memory of the sensor.

6. The method of claim 1,
   where the header includes a source address, and
   where the source address is different from the sensor identifier.

7. The method of claim 1, further comprising:
   generating, after modifying the payload of the topology trace packet, a report based on the topology trace packet; and
   sending the report using a source Internet Protocol (IP) address of the topology trace packet as a destination address of the report.

8. The method of claim 1, further comprising:
   copying, from the header of the topology trace packet and before sending the topology trace packet, a source media access control (MAC) address or a destination MAC address to the payload of the topology trace packet.

9. The method of claim 1, where the topology trace packet comprises information about at least one device that the topology trace packet previously passed through before arriving to the sensor.

10. A system comprising:
    a sensor to:
       identify a topology trace packet;
       modify, to obtain a modified topology trace packet, a payload of the topology trace packet to include a sensor identifier, of the sensor, without modifying a destination address of the topology trace packet; and
       send the modified topology trace packet in a direction of a node identified by the destination address of the modified topology trace packet.

11. The system of claim 10, where the sensor is further to:
    generate a report based on the modified topology trace packet; and
    send the report to a topology manager.

12. The system of claim 11, where the report includes the sensor identifier and another sensor identifier of another sensor that processed the topology trace packet before the sensor.

13. The system of claim 11, where, when sending the report, the sensor is to:
send the report to the topology manager by using a source Internet Protocol (IP) address of the topology trace packet as a destination address of the report.

14. The system of claim 10,
where the payload of the topology trace packet comprises a first time-to-live (TTL) value, and
where the sensor is further to:
identify a second TTL value at the sensor;
determine a difference between the first TTL value and the second TTL value; and
include, in the modified topology trace packet, information identifying the difference.

15. The system of claim 10, where the topology trace packet comprises information about at least one device that the topology trace packet previously passed through before arriving to the sensor.

16. A non-transitory computer-readable medium storing instructions, the instructions comprising:
one or more instructions that, when executed by a sensor, cause the sensor to:
identify a topology trace packet;
modify, to obtain a modified topology trace packet, a payload of the topology trace packet to include a sensor identifier, of the sensor, without modifying a header of the topology trace packet; and
send the modified topology trace packet in a direction of a node identified by a destination address of the modified topology trace packet.

17. The non-transitory computer-readable medium of claim 16,
where the instructions further comprise:
one or more instructions that, when executed by the sensor, cause the sensor to:
receive a packet;
identify a pattern in the packet; and
determine that the pattern matches an authentication pattern stored in a memory of the sensor, and
where the one or more instructions to identify the topology trace packet comprise:
one or more instructions that, when executed by the sensor, cause the sensor to:
determine that the packet is the topology trace packet based on determining that the pattern matches the authentication pattern.

18. The non-transitory computer-readable medium of claim 16, where the instructions further comprise:
one or more instructions that, when executed by the sensor, cause the sensor to:
copy, from the header of the topology trace packet, a source media access control (MAC) address to the payload of the topology trace packet.

19. The non-transitory computer-readable medium of claim 16, where the instructions further comprise:
one or more instructions that, when executed by the sensor, cause the sensor to:
generate a report based on the modified topology trace packet; and
send the report using a source Internet Protocol (IP) address of the topology trace packet as a destination address of the report.

20. The non-transitory computer-readable medium of claim 16, where the instructions further comprise:
one or more instructions that, when executed by the sensor, cause the sensor to:
identify a current time-to-live (TTL) value at the sensor; and
include, in the modified topology trace packet, information identifying the current TTL value.

21. The non-transitory computer-readable medium of claim 16, where the topology trace packet comprises information about at least one device previously passed by the topology trace packet before arriving to the sensor.

* * * * *